(12) United States Patent
Jacquin et al.

(10) Patent No.: US 10,425,282 B2
(45) Date of Patent: Sep. 24, 2019

(54) VERIFYING A NETWORK CONFIGURATION

(71) Applicant: HEWLETT PACKARD ENTERPRISE DEVELOPMENT LP, Houston, TX (US)

(72) Inventors: Ludovic Emmanuel Paul Noel Jacquin, Bristol (GB); Adrian Shaw, Bristol (GB); Chris I. Dalton, Bristol (GB)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 192 days.

(21) Appl. No.: 15/500,919

(22) PCT Filed: Nov. 28, 2014

(86) PCT No.: PCT/US2014/067814
§ 371 (c)(1),
(2) Date: Jan. 31, 2017

(87) PCT Pub. No.: WO2016/085516
PCT Pub. Date: Jun. 2, 2016

(65) Prior Publication Data
US 2017/0222878 A1    Aug. 3, 2017

(51) Int. Cl.
*H04L 12/24* (2006.01)
*H04L 12/26* (2006.01)

(52) U.S. Cl.
CPC ...... *H04L 41/0866* (2013.01); *H04L 41/0893* (2013.01); *H04L 41/28* (2013.01); *H04L 43/04* (2013.01)

(58) Field of Classification Search
CPC . H04L 41/0866; H04L 41/0893; H04L 41/28; H04L 43/04
See application file for complete search history.

(56) References Cited

U.S. PATENT DOCUMENTS

| 7,574,600 B2 | 8/2009 | Smith |
| 7,882,221 B2 | 2/2011 | Sailer et al. |

(Continued)

FOREIGN PATENT DOCUMENTS

| CN | 103226675 A | 7/2013 |
| CN | 104049972 A | 9/2014 |

(Continued)

OTHER PUBLICATIONS

Arm Ltd., "ARM TrustZone," Retrieved from Internet on May 11, 2017, pp. 1-4, Available at: <arm.com/products/processors/technologies/trustzone/index.php>.

(Continued)

*Primary Examiner* — Mohamed A. Wasel
(74) *Attorney, Agent, or Firm* — Hewlett Packard Enterprise Patent Department

(57) ABSTRACT

A computing device having instructions that when executed by a processor may: receive, from a verifier, a request for attestation of a current network configuration of the computing device; identify network configuration rules, each network configuration rule specifying an action to be taken by the computing device in response to receiving a particular type of network traffic; generate, for each network configuration rule, a rule abstraction that represents the network configuration rule; provide data representing each rule abstraction to a trusted component; receive, from the trusted component, response data comprising i) data representing each rule abstraction, and ii) a digital signature; and provide the response data to the verifier as attestation proof of the current network configuration of the computing device.

20 Claims, 4 Drawing Sheets

(56) References Cited

U.S. PATENT DOCUMENTS

| | | | |
|---|---|---|---|
| 8,176,336 | B1 | 5/2012 | Mao et al. |
| 8,248,958 | B1 | 8/2012 | Tulasi et al. |
| 8,544,092 | B2 | 9/2013 | Hermann et al. |
| 8,667,263 | B2 | 3/2014 | Challener et al. |
| 9,654,465 | B2* | 5/2017 | Balmakhtar .......... H04W 12/12 |
| 9,769,186 | B2* | 9/2017 | Teddy ................. H04L 63/1416 |
| 9,787,572 | B2* | 10/2017 | Voit .................... H04L 41/0873 |
| 2003/0145069 | A1 | 7/2003 | Lau et al. |
| 2006/0026419 | A1 | 2/2006 | Arndt et al. |
| 2008/0040478 | A1 | 2/2008 | Bogner |
| 2008/0141024 | A1 | 6/2008 | Ranganathan |
| 2008/0181136 | A1 | 7/2008 | Watanabe et al. |
| 2008/0229097 | A1 | 9/2008 | Bangerter et al. |
| 2008/0235372 | A1 | 9/2008 | Sailer et al. |
| 2009/0178138 | A1 | 7/2009 | Weiss et al. |
| 2009/0204964 | A1 | 8/2009 | Foley et al. |
| 2012/0023568 | A1 | 1/2012 | Cha et al. |
| 2013/0298242 | A1 | 11/2013 | Kumar et al. |
| 2013/0304903 | A1 | 11/2013 | Mick et al. |
| 2014/0013451 | A1 | 1/2014 | Kulka et al. |
| 2014/0075519 | A1* | 3/2014 | Porras .................. H04L 63/107 726/4 |
| 2014/0177634 | A1* | 6/2014 | Jiang ..................... H04L 45/64 370/392 |
| 2014/0189811 | A1 | 7/2014 | Taylor et al. |
| 2014/0331309 | A1 | 11/2014 | Spiers et al. |
| 2015/0089566 | A1* | 3/2015 | Chesla ................... H04L 63/20 726/1 |
| 2015/0365193 | A1* | 12/2015 | Connolly ........... H04L 41/0803 398/52 |
| 2016/0191466 | A1* | 6/2016 | Pernicha ................ H04L 63/20 726/1 |
| 2017/0230245 | A1* | 8/2017 | Jacquin .................. H04L 41/28 |

FOREIGN PATENT DOCUMENTS

| | | |
|---|---|---|
| EP | 2779564 A1 | 9/2014 |
| WO | WO-2013097901 A1 | 7/2013 |
| WO | WO-2013104375 A1 | 7/2013 |

OTHER PUBLICATIONS

Aryan Taherimonfared, "Securing the IAAS Service Model of Cloud Computing Against Compromised Components," Jun. 20, 2011, pp. 1-186, NTNU, Available at: <diva-portal.org/smash/get/diva2:438670/FULLTEXT01.pdf>.

Diego Kreutz et al., "Software-Defined Networking: A Comprehensive Survey," Jun. 2, 2014, pp. 1-49, Version 1.0, IEEE, Available at: <arxiv.org/abs/1406.0440>.

Intel Corporation, "Building Trust and Compliance in the Cloud with Intel Trusted Execution Technology," White Paper, 2013, pp. 1-18.

Intel Corporation, "Implementing SDN and NFV with Intel Architecture," White Paper, 2013, pp. 1-8.

International Search Report and Written Opinion, International Application No. PCT/US2014/067814, dated Aug. 20, 2015, pp. 1-10, KIPO.

J. Christopher Bare, "Attestation and Trusted Computing," Mar. 2006, pp. 1-10, CSEP590.

Liqun Chen et al., "A Protocol for Property-Based Attestation," 2006, pp. 1-10, ACM.

Openstack, "Trusted Compute Pools," 2013, 1-page, Available at: <docs.openstack.org/admin-guide-cloud/content/trusted-compute-pools.html>.

Robert Soule et al., "Merlin: A Language for Provisioning Network Resources," 2014, pp. 1-12.

Surya Nepal et al,, "Trust Extension Device: Providing Mobility and Portability of Trust in Cooperative Information Systems," 2007, pp. 253-271, Springer-Verlag Berlin Heidelberg.

Tien Tuan Anh Dinh and Mark Dermot Ryan, "Trusted Computing: TCG Proposals," Nov. 4, 2006, pp. 1-9, Available at: <cs.bham.ac.uk/~mdr/teaching/modules/security/lectures/TrustedComputingTCG.html>.

Trusted Computing Group, Inc., "TPM Man, Part 1 Design Principles," Mar. 1, 2011, pp. 1-184, Specification Version 1.2, Revision 116, Available at: <trustedcomputinggroup.org/wp-content/uploads/TPM-Main-Part-1-Design-Principles_v1.2_rev116_01032011.pdf>.

Xitao Wen, "NFV Attestation Survey," PowerPoint Presentation, Nov. 17, 2014, pp. 1-21, Available at: <slideserve.com/claire-rivera/nfv-attestation-survey>.

Tamleek Ali et al., "Scalable, Privacy-preserving Remote Attestation in and Through Federated Identity Management Frameworks," Feb. 24, 2010, pp. 1-8, Available at: <csrdu.org/pub/nauman/pubs/tshib-icisa10.pdf>.

Song Cheng et al, "A Security-Enhanced Remote Platform Integrity Attestation Scheme," Sep. 2009, pp. 1-4, IEEE.

International Search Report and Written Opinion, International Application No. PCT/US2014/067818, dated Aug. 5, 2015, pp. 1-12, KIPO.

* cited by examiner

VERIFYING A NETWORK CONFIGURATION

STATEMENT OF GOVERNMENT INTEREST

"The work leading to this invention has received funding from the European Union Seventh Framework Programme (FP7/2007-2013) under Grant Agreement No 611458."

CROSS-REFERENCE TO RELATED APPLICATIONS

This application is related to application Ser. No. 15/500, 918, filed on Nov. 28, 2014, and titled "Verifying a Network Configuration," the entirety of which is incorporated herein by reference.

BACKGROUND

Software defined networking allows for flexibility in the network configurations used to manage network communications between network elements that are included in a software defined network (SDN). An SDN controller that manages the network elements in an SDN is capable of dynamically reconfiguring the network configuration of individual network elements. While non-SDN networks implicitly trust network administrators to correctly manage network hardware, SDN network administrators generally manage the SDN controllers, leaving the management of the individual network elements to the SDN controllers.

BRIEF DESCRIPTION OF THE DRAWINGS

The following detailed description references the drawings, wherein.

DETAILED DESCRIPTION

Figure 1A:
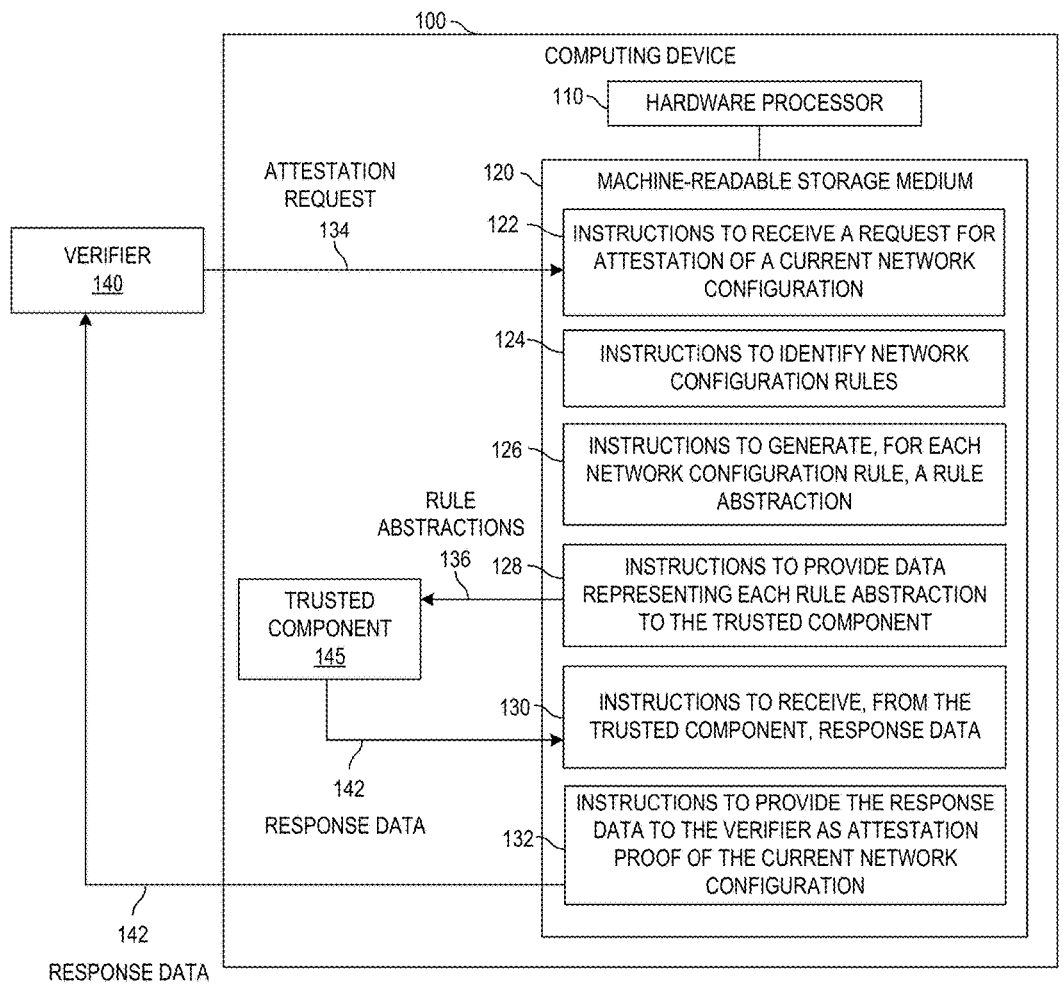
FIG. 1A is a block diagram of an example computing device for verifying a network configuration.

In a software defined network, one or more SDN controllers are configured to manage the network elements, e.g., routers, switches, and servers, which control the flow of network traffic throughout the SDN. While an administrator may configure SDN controllers, the configuration of the network elements is generally performed by the SDN controller. Without the implied trust conveyed to devices directly managed by an administrator, other methods are used to verify network configurations of network elements.

By way of example, an SDN may be used to manage cloud computing infrastructure. SDN controllers tell the various network elements included in the SDN where they should route traffic and, in some implementations, dynamically change configurations. SDN controllers may change configurations, for example, as part of a load balancing routine, responsive to one or more network elements crashing, or responsive to clients requesting specific configurations of the network elements used. If, for example, a client would like to keep its SDN network traffic on dedicated network elements that are not in use by any other clients, an SDN controller may reconfigure a subset of network elements to specifically handle the client's work and to reject any traffic received, directly or indirectly, from or for another client.

While the SDN controller may store the current state of some or all the SDN, including individual network element configurations, a client may request verification of certain network element characteristics directly from the network elements, so as not to rely on the SDN controller.

A network element included in the SDN is capable of attesting to its current network configuration to a verifier requesting attestation of the network element. The verifier requesting attestation may be internal or external to the SDN, e.g., the client or an SDN verifier. To perform verification, a network element may abstract its current network configuration and use a trusted component included in the network element to deliver verification to the requesting verifier. The trusted component, described in further detail below, may facilitate provision of the secure and verifiable attestation proof requested by the verifier to confirm the network configuration of a network element.

By way of example, a network element included in an SDN may receive, from a verifier, a request for attestation of the current network configuration of the network element. The network element can identify the local stored networking configuration rules currently in use, e.g., the port forwarding rules used by the network element to handle network traffic of various types and from various sources.

The network element may create an abstraction of each network configuration rule. Each abstraction may be, for example, a regular expression that represents the corresponding network configuration rule. Data representing the rule abstractions is provided to a trusted component included in the network element.

The trusted component provides response data that includes data representing each rule abstraction and a digital signature attesting the identity of the network element. The response data may be provided to the verifier as attestation proof of the network configuration of the network element. In this manner, network elements are able to attest to their network configurations and, in some implementations, software measurements indicating the state of software on the network elements.

In the SDN cloud computing example, a client may be able to verify that the network configuration of each network element ensures, among other things, network traffic isolation within the SDN cloud. Other example attestations include verifying, via software measurements and/or network configuration rules, a particular type of encryption used to transmit data; verifying that network traffic is limited to network elements operating in a single country, or that network traffic is excluded from one or more countries; verifying that particular versions of software are running on the network elements that handle a particular client's network traffic; or verifying that another client's network traffic, such as that of a client competitor, is isolated from the network elements that handle the client's network traffic. Many other network element properties, including network configurations, may be attested to by network elements.

Figure 1B:
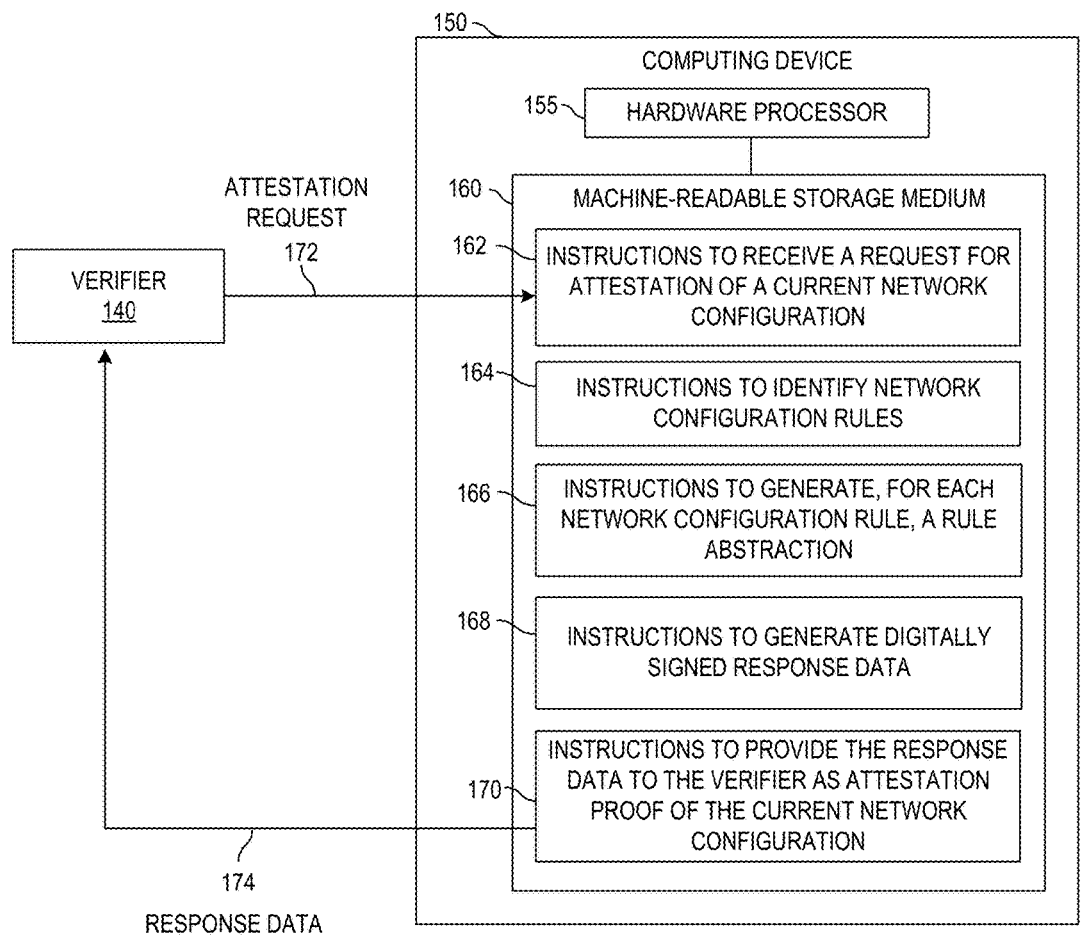
FIG. 1B is a block diagram of another example computing device for verifying a network configuration.

Referring now to the drawings, FIGS. 1A and 1B are block diagrams of an example computing devices 100, 150 for verifying a network configuration. Computing devices 100 and 150 may be, for example, a network element, such as a server computer, a network switch, a network router, or any other electronic device suitable for use in an SDN. In the embodiments of FIGS. 1A and 1B, computing devices 100 and 150 include hardware processors, 110 and 155, and machine-readable storage mediums, 120 and 160.

Hardware processors 110 and 155 may be one or more central processing units (CPUs), semiconductor-based microprocessors, and/or other hardware devices suitable for retrieval and execution of instructions stored in respective machine-readable storage mediums, 120 and 160. Hardware processors 110 and 155 may fetch, decode, and execute instructions, such as 122-132, and/or 162-170, to control the process for network configuration verification. As an alternative or in addition to retrieving and executing instructions, hardware processors 110 and 155 may include one or more electronic circuits that include electronic components for performing the functionality of one or more of instructions.

A machine-readable storage medium, such as 120 or 160, may be any electronic, magnetic, optical, or other physical storage device that contains or stores executable instructions. Thus, machine-readable storage medium 120 may be, for example, Random Access Memory (RAM), an Electrically Erasable Programmable Read-Only Memory (EEPROM), a storage device, an optical disc, and the like. In some implementations, storage medium 120 may be a non-transitory storage medium, where the term "non-transitory" does not encompass transitory propagating signals. As described in detail below, machine-readable storage mediums 120 and 160 may be encoded with a series of executable instructions: 122-132 and 162-170, respectively, for verifying a network configuration of the respective computing devices, 100 and 150.

Computing devices operating as network elements in an SDN, such as computing devices 100 and 150, may be responsible for receiving, processing, and forwarding network traffic. The manner in which network elements handle network traffic is specified in a network configuration stored on a storage device of the network element. The network configuration is generally provided to each network element by an SDN controller that is capable of dynamically configuring network elements as needed. For example, in a cloud computing environment, an SDN controller can direct network traffic received from multiple client devices to various back-end server computers for processing. The SDN controller may direct network traffic by adding and/or updating network configurations of switches, routers, and servers within the SDN, ensuring, for example, that each network element handles the traffic in an approved manner, e.g., ensuring each client device has at least one dedicated back-end server, or ensuring that client device communications are handled by back-end servers in a certain geographic location.

The separation of the control plane, e.g., within the SDN controller, from the data plane, e.g., where the network elements operate, breaks the trust model used in a traditional network. For example, network administrators of traditional networks were implicitly trusted to correctly manage the network hardware; however, with an SDN, a network administrator generally has visibility over the SDN controller only, relying on the SDN controller to correctly manage the individual network elements. As described in further detail below, a trusted component included in each network element may be used to dynamically and remotely facilitate verification of network configurations.

As shown in FIG. 1A, the computing device 100 receives an attestation request 134 from a verifier 140 (122). The request is for attestation of a current network configuration of the computing device 100. The verifier 140 may be any device in communication with the computing device 100, such as a client computing device, a front-end or back-end server computer, the SDN controller, a third-party verification device, or a trust delegation component, to name a few.

The computing device 100 identifies network configuration rules (124). Each network configuration rule specifies an action to be taken by the computing device 100 in response to receiving a particular type of network traffic. For example, one network configuration rule may specify that network traffic coming from a source with a particular internet protocol (IP) address or media access control (MAC) address be forwarded to a particular network element; another network rule may specify that Secure Shell (SSH) network traffic should be discarded. The active network configuration rules make up the current network configuration of the computing device 100.

In some implementations, each of the identified network configuration rules (or a subset thereof) may have been included in a current network configuration file that was provided by an SDN controller in communication with the computing device 100. For example, one or more SDN controllers may be in communication with the computing device 100, and each SDN controller may provide one or more network configurations to the computing device 100. The computing device 100 may store multiple network configurations from multiple SDN controllers in a local storage device or medium (e.g. medium 120), and dynamically change configurations at the direction of an SDN controller.

For each network configuration rule, the computing device 100 generates a rule abstraction (126). Network configuration rules may be abstracted, for example, to facilitate communication of the rules in a particular manner, simplifying interpretation of rules. In some implementations, each rule abstraction includes a regular expression that represents, for each rule, the particular type of network traffic and the action to be taken by the computing device 100 in response to receiving that type of network traffic. By way of example, an OpenFlow network configuration rule, "Rule({TP_DST:80}, [forward(2)])," may be represented by the regular expression: {***80},{2*}.

While the computing device 100 may, in some implementations, provide the verifier 140 with the data representing the rule abstractions 244, this may be insufficient to properly attest the network configuration of the computing device 100 because the rule abstractions lack any attestation as to their source. Accordingly, further actions, as described below, may be taken to attest to the network configuration of the computing device 100 in a manner that verifies the identity of the computing device 100 to the verifier 140.

The computing device 100 provides data 136 representing each rule abstraction to a trusted component 145 included in or communicably coupled to the computing device 100 (128). The trusted component 145 is a hardware device that is capable of attesting to the identity of the computing device 100. In some implementations, the trusted component 145 is a Trusted Platform Module (TPM), e.g., as specified by the Trusted Computing Group. A TPM is a dedicated hardware processor designed to secure hardware and attest to software using cryptographic techniques. A TPM may, for example, monitor the behavior of a computing device during boot, and store values related to the software, including firmware, in Platform Configuration Registers (PCRs). The PCR values specify the condition of software running on the computing device monitored by the TPM. The TPM may cryptographically bind one or more of the PCR values using a unique key, allowing another party to verify both the identity and software of the computing device. While a TPM is one example of a trusted component 145, other devices that provide verification of the identity of the computing device

100 may be used as the trusted component. As used herein, software and firmware both include machine readable instructions.

Responsive to providing data 136 to the trusted component 145, the computing device 100 receives response data 142 from the trusted component 145 (130). The response data 142 includes data representing each rule abstraction in the data 136 and a digital signature. In some implementations, e.g., responsive to attestation of the software of the computing device 100 being requested, the response data also includes software measurements, e.g., PCR values. Digitally signed response data 142 may cryptographically bind the data representing the network configuration, and in some implementations PCR values, to the identity of the computing device 100.

The computing device 100 provides the response data 142 to the verifier as attestation proof of the current network configuration of the computing device 100(132). Responsive to the verifier 140 receiving the digitally signed response data 142, the verifier 140 may verify the source using a trusted third party (TTP), trusted certification authority (CA), or direct anonymous attestation (DAA) issuer. After verifying the response data 142, the verifier 140 may compare the network configuration specified in the response data 142 to the expected network configuration, e.g., as provided by an SDN controller, to verify that the current network configuration of the computing device 100 is as expected. In implementations where PCR values are also included in the response data 142, the verifier 140 may also compare the PCR values to expected PCR values, e.g., as provided by an SDN controller, to verify that the software of the computing device 100 is as expected.

As noted above, FIG. 1B is a block diagram of another example computing device 150 for verifying a network configuration. As with the computing device 100 of FIG. 1A, the computing device 150 receives, from a verifier 140, a request 172 for attestation of a current network configuration of the computing device 150 (162) and identifies network configuration rules that specify an action to be taken by the computing device in response to receiving a particular type of network traffic (164). The machine-readable storage medium 160 also stores instructions to generate, for each network configuration rule, a rule abstraction that defines the network configuration rule (166).

The computing device 150 generates digitally signed response data that includes data representing each rule abstraction and a digital signature (168). In some implementations, the generation of digitally signed response data may be performed by a trusted component, in a manner similar to that of FIG. 1A. In some implementations, the computing device 150 may obtain a key uniquely identifying the computing device 150 and use that key to digitally sign data representing each rule abstraction. For example, if the data representing each rule abstraction included a string of numbers, the computing device 150 may hash the string of numbers using a hash function, encrypt the hash using the unique key, and attach the encrypted hash—the digital signature—to the data representing the rule abstractions, creating digitally signed response data.

The computing device 150 provides the digitally signed response data 174 to the verifier 140 as attestation proof of the current network configuration of the computing device 150 (170). In implementations where the response data 174 is digitally signed in the manner described above, the verifier 140 may verify the source of the response data 174, as well as its integrity, by decrypting the digital signature using a public key that corresponds to the unique key, hashing the data to which the digital signature was attached, and comparing the second hash to the hash included in the digital signature. Matching hashes assures the identity of the computing device 150 is genuine—e.g., because the hash may only be obtained using the public key that corresponds to the computing device's unique key—and that the response data 174 has not been altered—e.g., because any alteration of the response data would change the hash, which would cause the hashes to not match properly.

Alternative and/or additional methods may be used to transmit data between the computing device 150 and the verifier 140. Other hash functions, encryption functions, and/or certification methods may be used to provide data in a manner that preserves trust for the verifier 140. In some implementations, a nonce may be used. A nonce is data that can be used to indicate freshness and/or prevent replay attacks. For example, a nonce, in the form of a random or pseudo-random number, may be provided to the computing device 150 by the verifier 140. The nonce may be encrypted when generating the digital signature and included in the response data 174. The nonce facilitates the prevention of replay attacks, for example, because each request or response should have its own unique nonce, and a request or response that includes a duplicate nonce may indicate that the request or response is a duplicate and should be ignored. The nonce facilitates freshness, for example, when the verifier 140 obtains a timestamp for the nonce, which indicates to the verifier 140 the timeliness of a response that includes the nonce from the computing device 150.

In some implementations, the request 172 for attestation may include a request for attestation of software measurements for the computing device 150. For example, the request 172 may specify a particular version number of a particular software application. The computing device 150 may store, e.g., in medium 160, software measurements that include the version of the particular software application that is running on the computing device 150. The software measurements may be included in the response data 174, e.g., using the same digital signature process described above.

In some implementations, software measurements stored by the computing device 150 are measured during boot-up of the computing device 150, e.g., by a trusted component, such as a TPM, and the software measurements may be PCR values stored in a secure portion of the computing device 150. The trusted component may, in some implementations, also store the unique key of the computing device 150 in secure data storage separately from medium 160, and may perform the digital signing of the response data, e.g., in a manner designed to ensure isolation of the software measuring and digital signature processes from the execution of other processes performed by the computing device 150.

Figure 2:
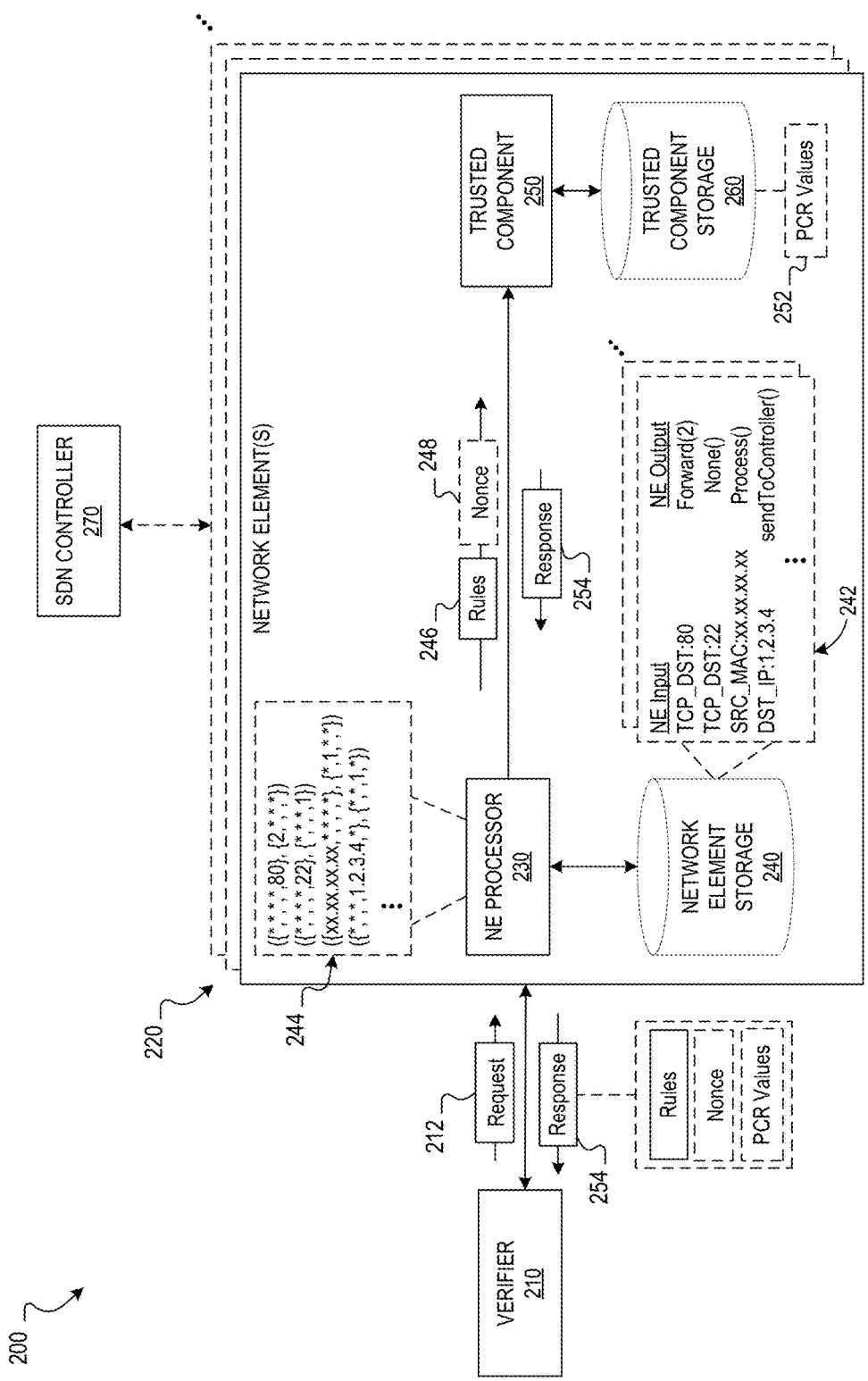
FIG. 2 is an example data flow for verifying a network configuration.

FIG. 2 is an example data flow 200 for verifying a network configuration. The data flow 200 depicts network element(s) 220 operating in an SDN and in communication with a verifier 210 and an SDN controller 270. Each network element may be, for example, a computing device, such as a computing device described above with respect to FIG. 1A or 1B. The SDN controller and network elements are included in an SDN managed by the SDN controller 270. In some implementations, the verifier 210 is also included in the SDN managed by the SDN controller 270. The verifier 210 may be requesting attestation on behalf of a third party (not shown) or requesting attestation on behalf of itself.

The verifier 210 provides the network element 220 with a request 212 for attestation of a network configuration of the network element 220. In some implementations, the request includes a request for attestation of software measurements, such as a list of software applications for which the verifier 210 is requesting corresponding version numbers. The request 212 may, in some implementations, include a nonce to facilitate prevention of replay attacks and preservation of freshness, as described above.

Responsive to the network element 220 receiving the request 212, a network element processor 230 accesses network configuration rules 242 stored in network element storage 240. Network elements 220 operating in an SDN may be dynamically configured by one or more SDN controllers, such as the SDN controller 270. Dynamic configuration happens, for example, responsive to an SDN controller instructing a network element 220 to change network configuration rules 242. Configuration changes may happen for any number of reasons. For example, the SDN controller 270 may reroute network traffic to avoid network elements that are experiencing problems, to redistribute network load, or to isolate particular types of network traffic. Each network element 220 may store multiple network configurations 242 in the network element storage 240, dynamically changing configurations at the direction of the SDN controller.

Each network configuration 242 includes a set of network configuration rules. Each network configuration rule specifies an action to be taken by the network element 220 in response to receiving a particular type of network traffic. In the example network configuration 242, the network element 220 is configured to forward to port 2 all network traffic with a transmission control protocol (TCP) destination port of 80. Other rules include taking no action on network traffic with a TCP destination port of 22, processing normally all traffic received from a device with a source MAC address of xx.xx.xx.xx, and sending traffic destined for IP address 1.2.3.4 to the SDN controller 270. The foregoing examples do not encompass all types of traffic or actions capable of being performed, other types of traffic and actions may also be specified by network configuration rules.

The network element processor 230 generates rules abstractions 244 that include an abstraction for each network configuration rule. For example, the rule abstractions 244 are regular expressions that represent, for each network configuration rule, the particular type of network traffic and the action to be taken by the network element 220 in response to receiving that particular type of network traffic. The particular regular expressions depicted in the example 200 is a pair of regular expression n-tuples, where the first n-tuple is used to represent the type of network traffic, and the second n-tuple is used to represent the action. The first n-tuple is a 6-tuple (*,*,*,*,*,*) that represents the following input types: (source MAC address, destination MAC address, source IP address, destination IP address, TCP source port, TCP destination port), while the second n-tuple is a 4-tuple (*,*,*,*) that represents the following actions: (forward to output port, process normally, send to SDN controller, discard). Accordingly, the first rule abstraction in the example abstractions 244 is {(*,*,*,*,80), (2,*,*,*)}, representing the first network configuration rule: TCP traffic with the destination port 80 is forwarded to output port 2. Network configuration rules 242 are abstracted in a manner designed to simplify manipulation and matching the rules.

The network element processor 230 provides a trusted component 250 included in or communicably coupled to the network element 220 with data representing each rule abstraction 246. For example, the data 246 provided to the trusted component 250 may be a set or string of the regular expressions 244 or a further abstraction, e.g., removing punctuation or other values. In implementations where the request 212 includes a nonce, the network element processor 230 also provides the nonce to the trusted component 250. In implementations where the request 212 includes a request for verification of software measurements, data specifying the software measurements request may also be sent to the trusted component 250.

The trusted component 250 is depicted separately in the network element 220 and may, in some implementations, include its own hardware processor and trusted component storage 260. For example, a TPM is a trusted component that has a hardware processor which is separate from the network element processor 230 and storage that is separate from other network element storage 240. In some implementations, the separation is logical, e.g., separate core(s) of the same hardware processor and/or separate partition of the same storage device. The separation of storage and processors of the trusted component 250 is designed to reduce the likelihood of tampering, and isolate the operations of the trusted component from interference by operations of the remainder of the network element 220.

Responsive to receiving the data 246, the trusted component 250 generates response data 254. The response data 254 includes data representing each rule abstraction represented in data 246 and, in implementations where software measurements are requested, the software measurements. For example, the response data 254 may include the regular expressions that represent the rule abstractions 244 and PCR values 252 for software specified in the request 212. The response data 254 may also include data representing the nonce in implementations where the request 212 provides a nonce.

In some implementations, the trusted component 250 digitally signs the response data 254 prior to providing it to the network element processor 230. As described above, the process of digitally signing the response data 254 may vary. For example, the trusted component 250 may be associated with a private key that is part of a public-private key pair. Data representing the network configuration rules, software measurements, and the nonce may be hashed, and the resulting hash value may be used to generate the digital signature by encrypting the hash value using the private key. The digital signature may be attached to the data representing the network configuration rules, software measurements, and nonce, and the combined data may be the response data 254. Other methods of generating and attaching a digital signature may be used.

The network element processor 230 receives the response data 254 from the trusted component 250 and provides the response data 254 to the verifier 210. Upon receipt of the response data 254, the verifier 210 may verify the response data in a number of ways, depending on the manner in which the response data 254 was generated. Using the example digital signature method described above, the verifier 210 may obtain the public key that corresponds to the private key of the trusted component and use the public key to decrypt the digital signature, obtaining the hash value. The verifier 210 may then run the un-hashed portion of the response data 254 representing the network configuration rules, software measurements, and nonce though the same hash function, resulting in a second hash value. Assuming the same hash function was used, and assuming that the un-hashed portion of the response data 254 was not altered, the second hash value should match the original hash value. In this manner, the verifier 210 can verify both the network configuration and software measurements, and compare them to any expected network configuration value or software measurement values.

Figure 3:
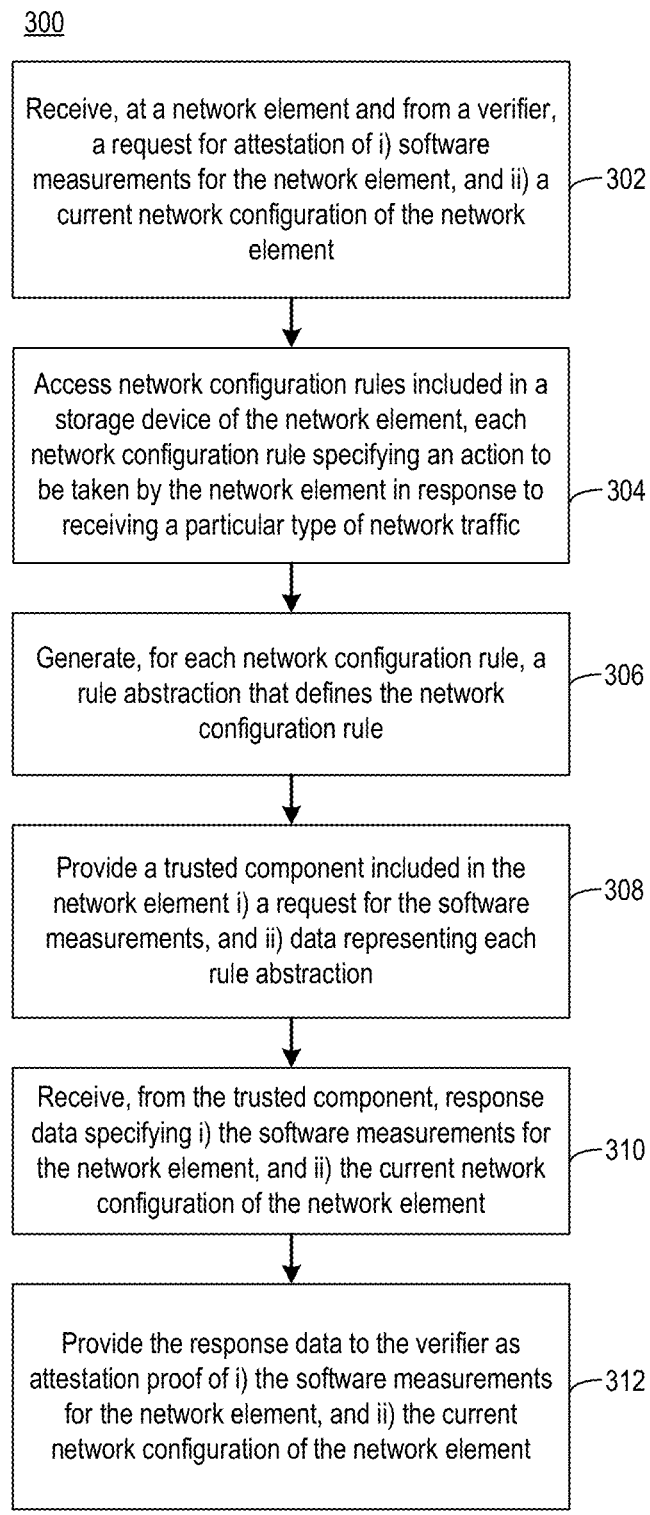
FIG. 3 is a flowchart of an example method for verifying a network configuration.

FIG. 3 is a flowchart of an example method 300 for verifying a network configuration. The method 300 may be performed by a computing device, such as a computing device described in FIGS. 1A and/or 1B. Other computing devices may also be used to execute method 300. Method 300 may be implemented in the form of executable instructions stored on a machine-readable storage medium, such as the storage mediums 120 and 160, and/or in the form of electronic circuitry.

A request is received, at a network element and from a verifier, for attestation of i) software measurements for the network element, and ii) a current network configuration of the network element (302). In some implementations, the network element is one of multiple network elements, e.g., routers, switches, and servers, included in an SDN that is under the control of one or more SDN controllers. The verifier may, in some implementations, also be included in the SDN.

Network configuration rules included in a storage device of the network element are accessed, each network configuration rule specifying an action to be taken by the network element in response to receiving a particular type of network traffic (304). For example, an SDN controller may instruct multiple network elements included in an SDN to use particular network configurations. The network configurations may vary depending on the network element and depending on the applications running on the SDN that control where and how network traffic is handled in the SDN.

For each network configuration rule, a rule abstraction is generated that defines the network configuration rule (306). In some implementations, each rule abstraction is in the form of a regular expression. For example, a pair of regular expression n-tuples may be used to specify a particular action for one or more input types.

A trusted component included in the network element is provided i) a request for the software measurements, and ii) data representing each rule abstraction (308). In some implementations, as described above, a nonce may also be provided to the trusted component. The trusted component may be, for example, a TPM that includes hardware isolated from the hardware of the network element and that monitors the network element during boot-up to measure PCR values to be stored in TPM storage.

Response data is received from the trusted component, the response data specifying i) the software measurements for the network element, and ii) data representing each rule abstraction (310). In some implementations, the software measurements are PCR values that were measured and stored by a TPM. In some implementations, the response data is digitally signed using a key that uniquely identifies the network element.

The response data is provided to the verifier as attestation proof of i) the software measurements for the network element, and ii) the current network configuration of the network element (312). For example, a digital signature may verify the integrity of the response data, the data specifying the current network configuration may be compared to expected network configuration data, and the software measurements, e.g., PCR values, may also be compared to expected PCR values. In this manner, a verifier may verify that both the software running on a network element, and the network configuration of the network element, are operating in a particular manner.

The foregoing disclosure describes a number of example implementations for verifying a network configuration. As detailed above, examples provide a mechanism for verifying that network elements, such as switches, routers, and servers operating in an SDN, are operating in a particular manner.

We claim:

1. A computing device for verifying a network configuration, the computing device comprising:
   a hardware processor;
   a trusted component; and
   a data storage device storing instructions that, when executed cause the processor to:
      receive, from a verifier, a request for attestation of a current network configuration of the computing device;
      identify network configuration rules, each network configuration rule specifying an action to be taken by the computing device in response to receiving a particular type of network traffic;
      generate, for each network configuration rule, a rule abstraction that represents the network configuration rule, wherein each rule abstraction comprises a regular expression representing, for each network configuration rule, i) the particular type of network traffic, and ii) the action to be taken by the network element in response to receiving the particular type of network traffic;
      provide data representing each rule abstraction to the trusted component;
      receive, from the trusted component, response data comprising i) data representing each rule abstraction, and ii) a digital signature; and
      provide the response data to the verifier as attestation proof of the current network configuration of the computing device.

2. The computing device of claim 1, wherein the request for attestation of the current network configuration includes a request for attestation of software measurements for the computing device, and wherein the response data received from the trusted component further comprises the software measurements.

3. The computing device of claim 2, wherein:
   the trusted component is a Trusted Platform Module; and
   the software measurements are platform configuration register (PCR) values.

4. The computing device of claim 1, wherein each of the identified network configuration rules are included in a current network configuration file that was provided by a software defined network controller in communication with the computing device.

5. The computing device of claim 1, wherein the trusted component is separate from the hardware processor.

6. The computing device of claim 1, further comprising instructions that, when executed by the processor, store a plurality of network configurations from a plurality of software defined network controllers and change, dynamically, the network configurations at the direction of one or more of the software defined network controllers.

7. The computing device of claim 1, wherein the data representing each rule abstraction comprises a further abstraction.

8. The computing device of claim 1, wherein the computing device is in a software defined network.

9. A non-transitory machine-readable storage medium encoded with instructions executable by a hardware processor of a computing device for verifying a network configuration, the machine-readable storage medium comprising instructions to:

receive, from a verifier, a request for attestation of a current network configuration of the computing device;

identify network configuration rules, each network configuration rule specifying an action to be taken by the computing device in response to receiving a particular type of network traffic;

generate, for each network configuration rule, a rule abstraction that defines the network configuration rule, wherein each rule abstraction comprises a regular expression representing, for each network configuration rule, i) the particular type of network traffic, and ii) the action to be taken by the computing device in response to receiving the particular type of network traffic;

generate digitally signed response data comprising i) data representing each rule abstraction, and ii) a digital signature; and provide the digitally signed response data to the verifier as attestation proof of the current network configuration of the computing device.

10. The machine-readable storage medium of claim 9, wherein the request for attestation of the current network configuration includes a request for attestation of software measurements for the computing device, and wherein the response data further comprises the software measurements.

11. The machine-readable storage medium of claim 10, further comprising:

obtaining platform configuration register (PCR) values, and wherein the software measurements included in the digitally signed response data are the obtained PCR values.

12. The machine-readable storage medium of claim 9, wherein each of the identified network configuration rules are included in a current network configuration file that was provided by a software defined network controller in communication with the computing device.

13. The machine-readable storage medium of claim 9, further comprising:

storing a plurality of network configurations from a plurality of software defined network controllers and changing, dynamically, the network configurations at the direction of one or more of the software defined network controllers.

14. The machine-readable storage medium of claim 9, wherein the computing device is in a software defined network.

15. A method for verifying a network configuration, implemented by a hardware processor, the method comprising:

receiving, at a network element in a software defined network and from a verifier, a request for attestation of i) software measurements for the network element, and ii) a current network configuration of the network element;

accessing network configuration rules included in a storage device of the network element, each network configuration rule specifying an action to be taken by the network element in response to receiving a particular type of network traffic;

generating, for each network configuration rule, a rule abstraction that defines the network configuration rule;

providing a trusted component included in the network element that is separate from the hardware processor i) a request for the software measurements, and ii) data representing each rule abstraction;

receiving, from the trusted component, response data specifying i) the software measurements, and ii) each abstraction for each network configuration rule; and providing the response data to the verifier as attestation proof of i) the software measurements for the network element, and ii) the current network configuration of the network element.

16. The method of claim 15, wherein:

the particular type of network traffic received by the network element specifies one or more of:
a source media access control (MAC) address;
a destination MAC address;
a source internet protocol (IP) address;
a destination IP address;
a transmission control protocol (TCP) source port; or
a TCP destination port; and the action to be taken by the network element includes one of:
forward to a particular output port;
process normally;
send to network controller; or
discard.

17. The method of claim 15, wherein each rule abstraction comprises a regular expression representing, for each network configuration rule, i) the particular type of network traffic, and ii) the action to be taken by the network element in response to receiving the particular type of network traffic.

18. The method of claim 15, wherein:

the request for attestation includes a nonce; and
the response data received from the trusted component is digitally signed and includes data representing the nonce.

19. The method of claim 15, wherein:

the network element is one of a plurality of network elements included in a software defined network;
the storage device of the network element includes a plurality of networking configurations, each of the plurality of networking configurations having a set of network configuration rules;
the software measurements are platform configuration register (PCR) values; and
the trusted component is a Trusted Platform Module (TPM).

20. The method of claim 15, further comprising:

storing a plurality of network configurations from a plurality of software defined network controllers and changing, dynamically, the network configurations at the direction of one or more of the software defined network controllers.

* * * * *